US008780824B2

(12) United States Patent
Maltsev et al.

(10) Patent No.: US 8,780,824 B2
(45) Date of Patent: Jul. 15, 2014

(54) HIGH THROUGHPUT COMMUNICATION STATION AND METHOD FOR COMMUNICATING OVER A PRIMARY CHANNEL AND A SECONDARY CHANNEL

(75) Inventors: Alexander A. Maltsev, Nizhny Novgorod (RU); Ali S Sadri, San Diego, CA (US); Vadim S Sergeyev, Nizhny Novgorod (RU); Adrian P Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 12/916,784

(22) Filed: Nov. 1, 2010

(65) Prior Publication Data
US 2011/0044273 A1  Feb. 24, 2011

Related U.S. Application Data

(63) Continuation of application No. 12/035,881, filed on Feb. 22, 2008, now Pat. No. 7,826,484, which is a continuation of application No. 10/676,372, filed on Sep. 30, 2003, now Pat. No. 7,349,436.

(51) Int. Cl.
*H04Q 7/00* (2006.01)
(52) U.S. Cl.
USPC ........................................................ 370/329
(58) Field of Classification Search
CPC .. H04W 72/0453; H04W 88/08; H04W 72/04
See application file for complete search history.

(56) References Cited

U.S. PATENT DOCUMENTS 5,022,046 A    6/1991  Morrow, Jr.
5,390,173 A    2/1995  Spinney et al.
(Continued)

FOREIGN PATENT DOCUMENTS

CN    1830171     9/2006
TW     449984     8/2001
(Continued)

OTHER PUBLICATIONS

"802.11gTM IEEE Local and Metropolitan Area Networks; Part 11: Wireless LAN Medium Access Control (MAC) and Physical Layer (PHY) specifications; Amendment 4:Further Higher Data Rate extension in the 2.4 GHz Band", IEEE Std. 802.11Gtm-2003, The Institute of Electrical and Electronics Engineers, Inc. NY, (Jun. 27, 2003), 78 pgs.

(Continued)

*Primary Examiner* — Hassan Phillips
*Assistant Examiner* — Prenell Jones
(74) *Attorney, Agent, or Firm* — Sutherland Asbill & Brennan LLP

(57) ABSTRACT

Embodiments of a high-throughput (HT) communication station (STA) and method for communicating over a primary and a secondary channel are generally described herein. In some embodiments, the high-throughput (HT) communication station (STA) comprises a physical layer (PHY) and a media-access control (MAC) layer to provide a data unit to the physical layer. The PHY layer may be configured to transmit a packet that includes the data unit over a channel bandwidth comprising a first channel and an additional channel in accordance with an OFDM communication technique. The packet may have a frame structure that includes a channel bandwidth parameter to indicate the channel bandwidth used, a modulation and coding parameter to indicate a modulation and coding scheme of the packet as transmitted over the channel bandwidth.

22 Claims, 6 Drawing Sheets

(56) References Cited

U.S. PATENT DOCUMENTS

| | | | | |
|---|---|---|---|---|
| 5,943,608 A * | 8/1999 | Sherman | ............ | 455/63.3 |
| 6,094,576 A | 7/2000 | Hakkinen et al. | | |
| 6,400,699 B1 | 6/2002 | Airy et al. | | |
| 6,563,858 B1 * | 5/2003 | Fakatselis et al. | ............ | 375/148 |
| 6,603,801 B1 * | 8/2003 | Andren et al. | ............ | 375/147 |
| 6,654,408 B1 | 11/2003 | Kadous et al. | | |
| 6,680,928 B1 * | 1/2004 | Dent | ............ | 370/342 |
| 6,765,532 B2 | 7/2004 | Vaccaro et al. | | |
| 7,031,293 B1 * | 4/2006 | Srikrishna et al. | ............ | 370/348 |
| 7,054,296 B1 * | 5/2006 | Sorrells et al. | ............ | 370/338 |
| 7,230,931 B2 | 6/2007 | Struhsaker | | |
| 7,286,606 B2 | 10/2007 | Maltsev et al. | | |
| 7,324,605 B2 * | 1/2008 | Maltsev et al. | ............ | 375/299 |
| 7,349,436 B2 | 3/2008 | Maltsev et al. | | |
| 7,450,489 B2 * | 11/2008 | Sandhu | ............ | 370/204 |
| 7,577,122 B1 * | 8/2009 | Schultz et al. | ............ | 370/338 |
| 7,756,002 B2 * | 7/2010 | Batra et al. | ............ | 370/208 |
| 7,826,484 B2 | 11/2010 | Maltsev et al. | | |
| 8,184,607 B2 | 5/2012 | Odenwalder et al. | | |
| 8,233,462 B2 * | 7/2012 | Walton et al. | ............ | 370/338 |
| 2002/0041578 A1 | 4/2002 | Kim et al. | | |
| 2002/0126618 A1 | 9/2002 | Kim | | |
| 2002/0126650 A1 | 9/2002 | Hall et al. | | |
| 2002/0136170 A1 | 9/2002 | Struhsaker | | |
| 2003/0058951 A1 | 3/2003 | Thomson et al. | | |
| 2003/0076777 A1 | 4/2003 | Stuber et al. | | |
| 2003/0161281 A1 | 8/2003 | Dulin et al. | | |
| 2003/0211831 A1 * | 11/2003 | Xu et al. | ............ | 455/63.3 |
| 2003/0224811 A1 | 12/2003 | Jain et al. | | |
| 2004/0001429 A1 | 1/2004 | Ma | | |
| 2004/0006674 A1 | 1/2004 | Hargis et al. | | |
| 2004/0085917 A1 | 5/2004 | Fitton et al. | | |
| 2004/0163129 A1 | 8/2004 | Chapman et al. | | |
| 2004/0196916 A1 | 10/2004 | Bohnke et al. | | |
| 2004/0202138 A1 | 10/2004 | Song et al. | | |
| 2005/0002326 A1 | 1/2005 | Ling et al. | | |
| 2005/0078707 A1 | 4/2005 | Maltsev et al. | | |
| 2005/0123060 A1 | 6/2005 | Maltsev et al. | | |
| 2005/0152473 A1 | 7/2005 | Maltsev et al. | | |
| 2005/0202784 A1 * | 9/2005 | Xu et al. | ............ | 455/63.3 |
| 2006/0274844 A1 | 12/2006 | Walton et al. | | |
| 2007/0223514 A1 | 9/2007 | Odenwalder et al. | | |
| 2008/0144732 A1 | 6/2008 | Maltsev et al. | | |
| 2008/0240001 A1 | 10/2008 | Struhsaker et al. | | |
| 2008/0259826 A1 | 10/2008 | Struhsaker | | |
| 2009/0059860 A1 | 3/2009 | Maltsev et al. | | |

FOREIGN PATENT DOCUMENTS

| | | |
|---|---|---|
| WO | WO-0199362 A2 | 12/2001 |
| WO | WO-03061204 A1 | 7/2003 |
| WO | WO-2005004500 A2 | 1/2005 |
| WO | WO-2005034435 A2 | 4/2005 |
| WO | WO-2005034435 A3 | 4/2005 |
| WO | WO-2005062518 A1 | 7/2005 |

OTHER PUBLICATIONS

U.S. Appl. No. 10/676,372, Non-Final Office Action mailed Jun. 13, 2007, 9 pgs.

U.S. Appl. No. 10/676,372, Notice of Allowance mailed Oct. 24, 2007, 5 pgs.

U.S. Appl. No. 10/676,372, Response filed Jul. 23, 2007 to Non-Final Office Action mailed Jun. 13, 2007, 20 pgs.

U.S. Appl. No. 10/728,476 Non Final Office Action mailed Mar. 2, 2007, 15 pgs.

U.S. Appl. No. 10/728,476 Notice of Allowance mailed Jun. 8, 2007, 8 pgs.

U.S. Appl. No. 10/728,476 Preliminary Amendment filed May 10, 2004, 3 pgs.

U.S. Appl. No. 10/728,476 Response filed Apr. 18, 2007 to Non Final Office Action mailed Mar. 2, 2007, 15 pgs.

U.S. Appl. No. 12/035,881 Notice of Allowance mailed Jun. 30, 2010, 7 pgs.

U.S. Appl. No. 12/035,881, Final Office Action mailed Feb. 22, 2010, 9.

U.S. Appl. No. 12/035,881, Non Final Office Action mailed Aug. 5, 2009, 14 pgs.

U.S. Appl. No. 12/035,881, Response filed May 11, 2010 to Final Office Action mailed Feb. 22, 2010, 8 pgs.

U.S. Appl. No. 12/035,881, Response filed Nov. 18, 2009 to Non Final Office Action mailed Aug. 5, 2009, 8 pgs.

Chinese Application Serial No. 2004800280365, Office Action mailed Jan. 2009, 14 pgs.

International Search Report for corresponding PCT Application No. PCT/US2004/031863, (Apr. 12, 2005), 5 pgs.

International Search Report for corresponding PCT Application No. PCT/US2004/038736, (Apr. 19, 2005), 4 pgs.

"Supplement to IEEE Standard for IT-Telecomm. & Info. Exchange Between Systems—Local and Metropolitan Area Networks—specific requirements. Part 11:Wireless LAN Medium Access Control(MAC)and Physical Layer(PHY)Specs:High-speed Physical Layer in 5GHZ Band", IEEE Std 802.11a-1999, (Dec. 30, 1999), 1-90.

Bangerter, Boyd, et al., "High-Throughput Wireless LAN Air Interface", Intel Technology Journal: Wireless Technologies, 7(3), http://developer.intel.com/technology/itj/index.htm, (Aug. 19, 2003), 47-57.

Khun-Jush, Jamshid, et al., Structure and performance of the HIPERLAN/2 physical layer, VTC 1999—Fall. IEEE VTS 50th Vehicular Technology Conference, vol. 5, (Sep. 19-27,), 2667-2671.

Motegi, M., et al., "Optimum Modulation Assignment According to Subband Channel Status for BST-OFDM", IEICE Transactions on Fundamentals of Electronics, Communications and Computer Sciences, Institute of Electronic Sciences, Institute of Electronics Information and Communications Eng., vol. E84-A (7), (Jul. 1, 2001), 1714-1722.

Zhen, L., et al., "A Modified Sub-Optimum Adaptive Bit and Power Allocation Algorithm in Wideband OFDM System", Canadian Conference on Electrical and Computer Engineering,(CCECE 2003), vol. 3 of 3, (May 4, 2003), 1589-1592.

Office Action received for European Patent Application No. 04785217.3, mailed on Dec. 28, 2010, 4 pages.

Final office action received for U.S. Appl. No. 12/916,770, Mailed on Jul. 31, 2013, 10 pages.

Office Action received for U.S. Appl. No. 12/916,770, mailed on Jan. 7, 2013, 10 pages.

Office Action received for Chinese Patent Application No. 200480028036.5, mailed on Sep. 25, 2009, 3 pages of Chinese Office Action and 5 pages of English Translation.

International Preliminary Report on Patentability and Written Opinion received for PCT Patent Application No. PCT/US2004/031863, mailed on Apr. 13, 2006, 10 pages.

Office Action received for U.S. Appl. No. 12/035,881, mailed on Feb. 22, 2010, 10 pages.

Office Action received for U.S. Appl. No. 12/035,881, mailed on Aug. 5, 2009, 11 pages.

Notice of Allowance received for U.S. Appl. No. 12/035,881, mailed on Jun. 30, 2010, 7 pages.

Office Action received for U.S. Appl. No. 12/916,770, mailed on Mar. 28, 2014, 11 pages.

Notice of Grant received for European Patent Application No. 04785217.3, mailed on Apr. 10, 2014, 2 pages.

* cited by examiner

| BIT # | CORRESPONDING PARAMETER | |
|---|---|---|
| 0 | PRESENCE OF DATA FIELD | 706 |
| 1 | BIT LOADING PER SUBCARRIER | 708 |
| 2 | POWER LOADING PER SUBCARRIER | 710 |
| 3 | CODING RATE | 712 |
| 4 | LENGTH | 714 |
| 5 | TX POWER LEVEL | 716 |
| 6 | AVAILABLE TX POWER LEVEL | 718 |
| 7 | CHANNELIZATION REQUEST | 720 |
| 8 | BIT LOADING PER SUBCARRIER REQUEST | 722 |
| 9 | CODE RATE REQUEST | 724 |
| 10 | POWER LOADING PER SUBCARRIER REQUEST | 726 |
| 11 | POWER REQUEST | 728 |
| 12 | DURATION RECOMMENDATION | 730 |
| 13 | SERVICE | 732 |
| 14 | CHANNEL RESERVATION DURATION | 734 |
| 15-17 | RESERVED | 738 |

PARAMETER MASK TABLE

Fig. 7

HIGH THROUGHPUT COMMUNICATION STATION AND METHOD FOR COMMUNICATING OVER A PRIMARY CHANNEL AND A SECONDARY CHANNEL

PRIORITY CLAIM

This application is a continuation of U.S. patent application Ser. No. 12/035,881 filed on Feb. 22, 2008, now U.S. Pat. No. 7,826,484 which is a continuation of U.S. patent application Ser. No. 10/676,372, filed on Sep. 30, 2003, now issued as U.S. Pat. No. 7,349,436, which are incorporated herein by reference in their entireties.

TECHNICAL FIELD

Embodiments of the present invention pertain to electronic systems, in particular to wireless communications, and in some embodiments, to high-throughput (HT) wideband (WB) communications with wireless local area networks (WLANs).

BACKGROUND

Orthogonal frequency division multiplexing (OFDM) is an example of a multi-carrier transmission technique that uses symbol-modulated orthogonal subcarriers to transmit information within an available spectrum. Many modern digital communication systems, including wireless local area networks (WLANS), are using symbol-modulated orthogonal subcarriers as a modulation scheme to help signals survive in environments having multipath reflections and/or strong interference. One problem with many conventional systems that use symbol-modulated subcarriers is that channel bandwidth is limited by the frame structure employed.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIG. 7 is a parameterization-mask table in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
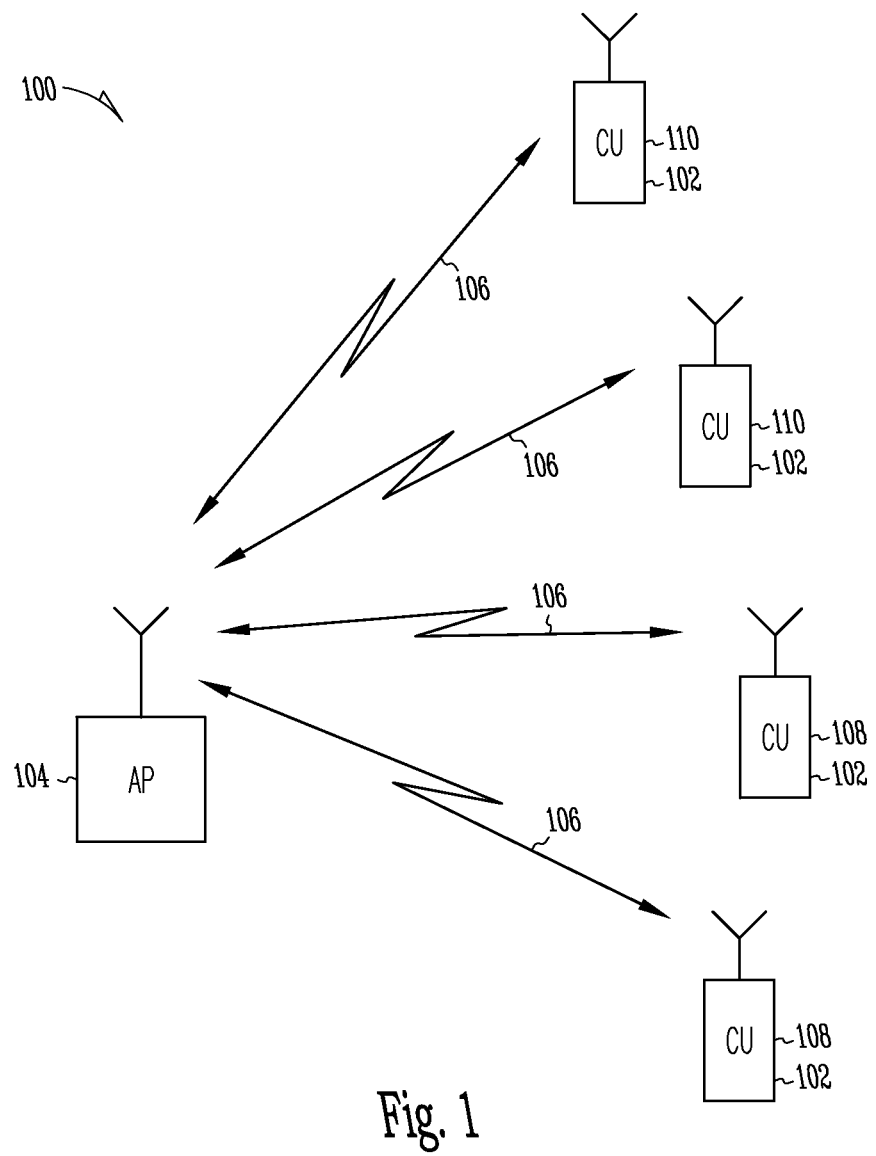
FIG. 1 illustrates an operational environment in which some embodiments of the present invention may be practiced.

FIG. 1 illustrates an operational environment in which some embodiments of the present invention may be practiced. Communication environment 100 may include one or more communication units (CUs) 102, which may communicate with one or more access points (AP) 104 over wireless communication links 106. CUs 102 may include, for example, mobile units such as personal digital assistants (PDAs), laptop and portable computers with wireless communication capability, web tablets, wireless telephones, wireless headsets, pagers, instant messaging devices, MP3 players, digital cameras, and other devices that may receive and/or transmit information wirelessly. In some embodiments, CUs 102 may also include access points (APs), although the scope of the invention is not limited in this respect.

In some embodiments, CUs 102 and AP 104 may communicate in accordance with one or more communication standards, such as one of the Institute of Electrical and Electronics Engineers (I.E.E.E.) 802.11 standards, although the scope of the invention is not limited in this respect. In these embodiments, CUs 102 may communicate among each other and/or with one or more of APs 104 using a multi-carrier transmission technique, such as an orthogonal frequency division multiplexing (OFDM) technique that uses orthogonal subcarriers to transmit information within an assigned spectrum. Other wireless local area network (WLAN) and wireless wide area network (WAN) communication techniques may also be suitable for communications between CUs 102 and AP 104.

In addition to facilitating communications between CUs 102, in some embodiments, APs 104 may be coupled with one or more networks, such as an intranet or the Internet, allowing CUs 102 to access such networks. Although FIG. 1 illustrates point-to-point communications (e.g., where an AP synchronizes with a network), embodiments of the present invention may also be suitable to point-to-multipoint communications, including peer-to-peer communications in which CUs may share the responsibility for synchronizing with a network.

Some embodiments of the present invention are applicable to communications between CUs 102 and APs 104 over links 106 in accordance with an infrastructure basic service set (IBSS) mode. Some embodiments of the present invention, however, are equally applicable to direct communications over links 106 between CUs 102 in an ad-hoc mode. In ad-hoc modes, CUs 102 may use channels of an IBSS. The IBSS channels may be a subset of the channels that are valid for a particular geographic region, although the scope of the invention is not limited in this respect.

In order to associate with a network through AP 104, a CU may scan channels to determine which channels are active and to determine network identifiers (e.g., SSIDs) associated with the active channels. This scanning is generally performed each time a communication unit wishes to associate with (e.g., become part of or join) a wireless network, and each time the communication unit wishes to re-associate with a network.

CUs 102 and AP 104 may be referred to herein as a transmitting unit, a receiving unit, or both. The terms "transmitting" and "receiving" are applied to communication units 102 and AP 104 for ease in understanding the embodiments of the present invention. It shall be understood that CUs and APs may include both transmitting and receiving capability to establish duplex communications therebetween.

In accordance with embodiments, links 106 may be bi-directional communication links comprising one or more channels. Each channel may be allocated a predetermined portion of spectrum, and in some embodiments, each channel may comprise approximately a 20 MHz portion of the spectrum. APs 104 that operate nearby other APs may be assigned non-interfering portions of spectrum. APs 104 and CUs 102 may use a frame structure for communicating therebetween, which may be time-division multiplexed to allow communications between many APs 104 and CUs 102 over one or more of the communication channels. In accordance with some embodiments, a channel may comprise a plurality of substantially orthogonal subcarriers that may be modulated with a data stream, such as with an OFDM channel.

In accordance with some embodiments, APs 104 and CUs 102 may use an observed or measured frequency selectivity and/or interference of a channel to select subcarrier modulation assignments for each subcarrier or groups of subcarriers. This may be referred to as adaptive bit loading (ABL). The subcarrier-modulation assignment decisions may affect the overall achieved data rate depending on the modulation orders selected. In accordance with some embodiments, APs 104 and CUs 102 may also select a transmit power level for the individual subcarriers, for groups of subcarriers, or for all the subcarriers of a channel. When combined with ABL, this may be referred to as adaptive bit and power loading (ABPL).

CUs 102 may comprise both wider-band CUs 108 and narrower-band CUs 110. Narrower-band CUs 110 may communicate on a single channel while wider-band CUs 108 may communicate on one or more of the channels to provide wider-bandwidth communications. Wider-band CUs 108 may be referred to as high-throughput (HT) CUs, and in some embodiments, wider-band CUs 108 may communicate in accordance with an IEEE 802.11 standard for HT WLAN communications. Narrower-band CUs 110 may communicate in accordance with the IEEE 802.11(a/g) standard for WLAN communications, although the scope of the invention is not limited in this respect. The terms narrower-band and wider-band refer to a relative communication bandwidth that may be utilized by the communication units. For example, in some embodiments, narrower-band CUs 110 may communicate on narrower-band channels (e.g., a 20 MHz channel), while wider-band CUs 108 may communicate on wider-band channels (e.g., channels of up to 80 MHz or greater). In these embodiments, the wider-band channels may comprise one or more of the narrower-band channels. AP 104 may include capability for communicating with both wider-band CUs 108 and narrower-band CUs 110.

To facility the sharing of channels among narrower-band CUs 110 and wider-band CUs 108, communication packets may have a predetermined frame structure to provide for this flexible channel-width capability. Examples of suitable frame structures are described in more detail below.

Figure 2:
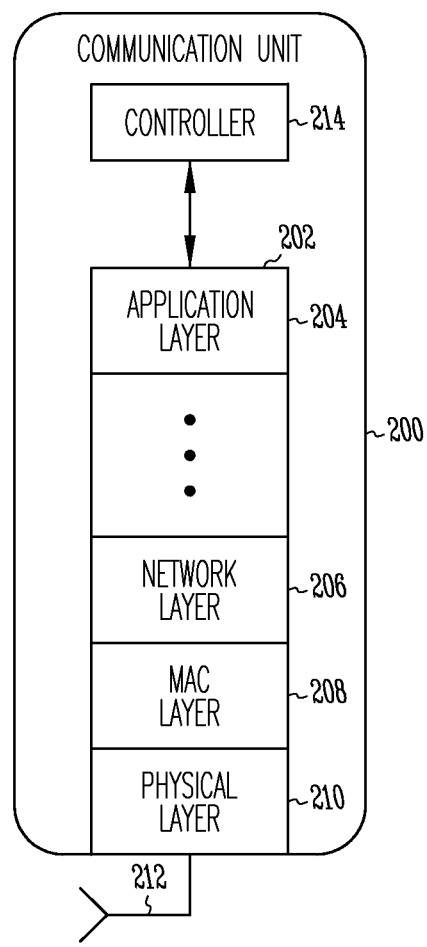
FIG. 2 is a block diagram of a communication unit in accordance with some embodiments of the present invention.

FIG. 2 is a block diagram of a communication unit in accordance with some embodiments of the present invention. Communication unit 200 may be suitable for use as one or more of CUs 108 (FIG. 1) and/or a HT AP such as AP 104 (FIG. 1), although other devices may also be suitable. Among other things, CU 200 may comprise protocol stack 202, which may include one or more layers, such as application layer 204, network layer 206, medium-access-control (MAC) layer 208, and physical layer (PHY) 210. Physical layer 210 may couple with antenna 212. CU 200 may also comprise controller 214 to coordinate the activity of the various elements of CU 200 and protocol stack 202. Antenna 212 may comprise a directional or omnidirectional antenna, including, for example, a dipole antenna, a monopole antenna, a loop antenna, a microstrip antenna or other type of antenna suitable for reception and/or transmission of RF signals which may be communicated by CU 200.

Although CU 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Physical layer 210 may generate a physical-layer packet format used to transport transmitted physical layer service data units (SDUs) to peers under the control of MAC layer 208. MAC layer 208 may control access to the medium and may select operating modes of physical layer 210. MAC layer 208 may be responsible for determining operating channels to select, and determining operating modes may be used within a wireless network. MAC layer 208 may also buffer network data to be transmitted, and in some embodiments, may choose modes of operation of physical layer 210 based on quality of service (QoS) requirements of specific streams of network data. MAC layer 208 may also scan or have other means of detecting the presence of narrower-band CUs 110 (FIG. 1), which it may use to select operating channels as well as the type of physical layer packet format to be used.

Figure 3:
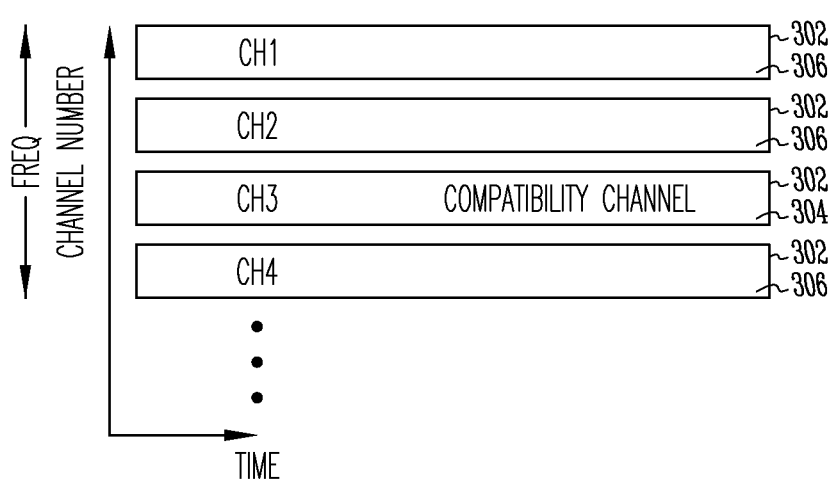
FIG. 3 illustrates frequency-spectrum allocation in accordance with some embodiments of the present invention.

FIG. 3 illustrates frequency-spectrum allocation in accordance with some embodiments of the present invention. Frequency spectrum 300 may be used for communications among CUs 102 (FIG. 1), and for communications between CUs 102 (FIG. 1) and AP 104 (FIG. 1). Frequency spectrum 300 may comprise a plurality of channels 302. In accordance with some embodiments, narrower-band CUs, such as CUs 110 (FIG. 1) may communicate using a single channel, such as one of channels 302, while wider-band CUs 108 may use one or more of channels 302 simultaneously. Although frequency spectrum 300 is illustrated as having four channels 302 (labeled as channels one through four), the scope of the invention is not limited in this respect. Embodiments of the present invention are equally suitable for use of more than four channels within an allocated portion of frequency spectrum 300. In some embodiments, the channels may be 20 MHz channels and frequency spectrum 300 may comprise at least a contiguous 80 MHz portion of the spectrum, although non-contiguous portions of spectrum are also suitable. In some embodiments, frequency spectrum 300 may be utilized by an AP for communicating with CUs including both narrower-band CUs and wider-band CUs.

In some embodiments, one channel, such as channel 304 may be designated a compatibility channel, and the other channels, such as channels 306, may be used for HT communications. In some embodiments, compatibility channel 304 may be used for communications for narrower-band CUs and may be used for association with an AP. In some embodiments, each AP may be assigned a particular compatibility channel 304 so as not to interfere with nearby APs. Compatibility channel 304 may also be used for carrier-sense multiple-access with collision avoidance (CSMA/CA).

Channels 306 may be suitable for HT communications depending on each individual channel's busy/idle state or channel quality. The decision about current channel state may be dynamically made by a wider-band CU based on current measurements, information obtained from received packets and statistical information.

An AP with capability for communicating with wider-band CUs may be referred to as a HT AP and may be assigned a compatibility channel different from its neighbors. In some embodiments, the frequency spectrum may comprise at least a portion of an unlicensed national information infrastructure (U-NII) band, although the scope of the invention is not limited in this respect. In some embodiments, a nearest neighboring AP may be decoupled by compatibility channels in different U-NII 80 MHz bands or by more detailed spectrum division. For example, the spectrum may be divided into sets of six 40 MHz channels.

In other embodiments, a HT AP may select channels 302 so that compatibility channel 304 and other channels 306 match those of surrounding HT APs. Performing channel access on compatibility channel 302 is used by HT CUs to "reserve" those channels at the same time as the compatibility channel. Having two different compatibility channels may provide two independent reservation mechanisms for the same resource. To help prevent collisions on the other channels, the compatibility channel provides for the reservation for the other channels. Therefore, overlapping HT AP may use matching compatibility channels.

Figure 4:
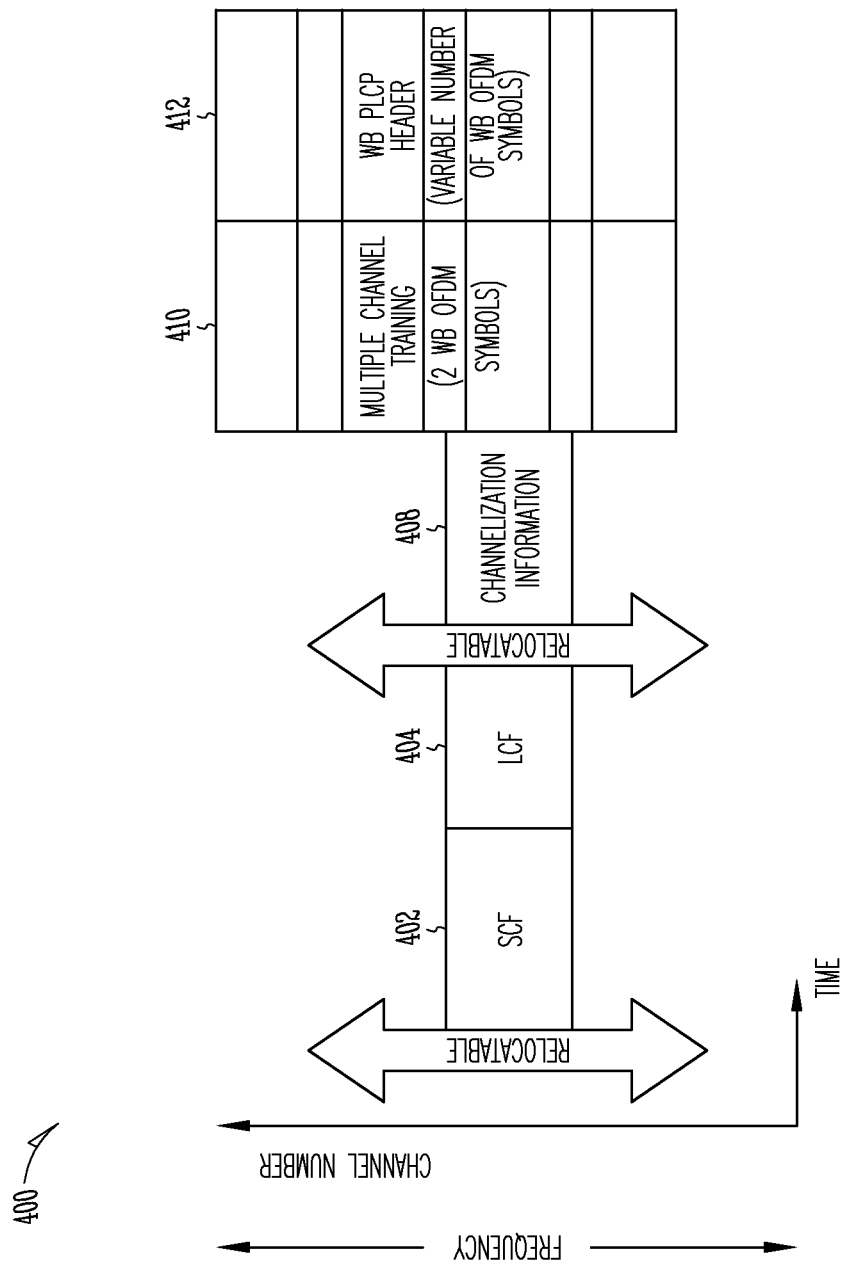
FIG. 4 illustrates a structure of a long-compatibility frame in accordance with some embodiments of the present invention.

FIG. 4 illustrates a structure of a long-compatibility frame in accordance with some embodiments of the present invention. Long-compatibility frame format 400 is an example of an HT OFDM frame and may be used for communications between wider-band CUs 108 (FIG. 1) and AP 104 (FIG. 1), although other frame formats may also be suitable. Frame format 400 may include short-compatibility field 402, long-compatibility field 404, channelization field 408, multiple-channel training field 410, and wideband-header field 412. In some embodiments, short-compatibility field 402, long-compatibility field 404, and channelization field 408 may be sent on a compatibility channel, such as compatibility channel 304 (FIG. 3), which may be relocatable to any of the narrower-band channels. Multiple-channel training field 410 and wideband-header field 412 may be sent on one or more channels, such as channels 306 (FIG. 3) including compatibility channel 304 (FIG. 3).

Short-compatibility field 402 may include a preamble and a signal field. The preamble may be a physical layer convergence protocol (PLCP) preamble, and in some embodiments, short-compatibility field 402 may comprise a standard 802.11 (a/g) preamble followed by a standard 802.11(a/g) signal field, although the scope of the invention is not limited in this respect. Short-compatibility field 402 may be present in wideband (WB) OFDM frames regardless of their MAC type. Short-compatibility field 402 may provide physical layer protection for the transmitted WB OFDM frame from unwanted interferences from narrower-band CUs by reserving a channel (i.e., one of channels 302 (FIG. 3)) at the PHY layer. For example, length and rate information in the signal field be used to determine the time for the WB OFDM data interchange.

Depending on a frame type and interfering environment, short-compatibility field 402 may be transmitted over compatibility channel 304 (FIG. 3), or alternatively, short-compatibility field 402 may be multiplied in frequency domain and transmitted over several or all channels 302 (FIG. 3). The length and rate parameters of the signal field may be depend on the presence of long-compatibility field 404 in frame format 400. When long-compatibility field 404 is present in the frame, the length and rate parameters of short-compatibility field 402 may describe the length in octets and bit rate of long-compatibility field 404. When long-compatibility field 404 is not present in the frame, these parameters may be chosen to describe a virtual frame with duration corresponding to the duration of an entire HT data interchange, such as a series of control signals and/or data including, for example, request-to-send (RTS), clear-to-send (CTS), data, and acknowledgement (ACK) signals.

Long-compatibility field 404 may include a service sub-field and a physical-service data unit (PSDU) sub-field, and may be transmitted over the compatibility channel. In some embodiments, long-compatibility field 404 may be a standard 802.11(a/g) data field. Tail bits and pad bits may be added to long-compatibility field 404. Long-compatibility frame format 400 may be used for frames of MAC type 'control'. Long-compatibility field 404 may carry an appropriate management protocol data unit (MPDU). Long-compatibility field 404 may also be used for frames of MAC type 'data' or for MAC management frames.

In accordance with some embodiments of the present invention, long-compatibility field 404 provides MAC layer protection of a transmitted WB OFDM frame from unwanted interferences from narrower-band CUs by reserving the medium (e.g., reserving time on one or more channels) using a MAC protocol, such as setting the narrower-band CUs network allocation vector (NAV) to cover the duration of the wider-band data interchange. When long-compatibility field 404 is present in a packet, length and rate values in the signal field of short-compatibility field 402 may be set to describe a modulation type and a data length actually used while transmitting long-compatibility field 404.

In some embodiments, to reduce MAC changes, either long-compatibility field 404 or a wideband-data field may be used in a single frame. When long-compatibility field 404 is used, the MPDU may reside in it. When a wideband-data field is used, the MPDU(s) may reside in the wideband-data field, which is described in more detail below.

Channelization field 408 may include information about the frequency channelization structure of the subsequently transmitted wideband portions of a physical protocol data unit (PPDU) (e.g., packet 400). When short-compatibility field 402 is initially transmitted over more than one channel to indicate busy (e.g., used) channels, channelization field 408 may be omitted because the channelization may be implicit by which channel short-compatibility field 402 is received on.

To determine whether channelization field 408, wideband-training field 410 and wideband-header field 412 are incorporated into a packet, a wider-band CU may attempt to receive channelization field 408 and may then attempt to detect the wideband-training field 410 with the appropriate channelization. If the detection of wideband-training field 410 is successful, the wider-band CU may then receive wideband-header field 412. Otherwise the CU may terminate the receiving.

Wideband-training field 410 may comprise multiple-channel training fields, and may be used for timing and fine-frequency-offset estimation, and channel estimation. These multiple-channel training fields may also be used for dynamic equalization and channel transfer-function variation rate-measurement purposes. In some embodiments, wideband-training field 410 may comprise a standard 802.11(a/g) long training sequence multiplied in frequency domain and transmitted over one or more of the channels.

In some embodiments, the phases of long training sequence may be rotated among the channels to reduce peak-to-average power ratio. In some embodiments, mid-fix training preambles may be incorporated into a wideband packet and positioned within the packet, and post-fix training preambles may be incorporated into the packet and positioned at the end of the packet.

Wideband-header field 412 may be a PLCP-header field and may contain parameters for demodulation and decoding the packet including parameters for adaptive modulation and coding techniques. Wideband-header field 412 may follow wideband-training field 410. Wideband-header field 412 may be transmitted with the channelization indicated in channelization field 408. When short-compatibility field 402 is transmitted over more than one channel, the channelization of wideband-header field 412 may be indicated by the frequency configuration of short-compatibility field 402. Wideband-header field 412 may be encoded and modulated using uniform robust modulation and encoding schemes, such as BPSK or QPSK modulation and a convolutional code with a rate of ½. The size of wideband-header field 412 may be variable. Examples of particular parameters included into wideband-header field 412 are described below in more detail below. In some embodiments, wideband-header field 412 may include a parameter mask to indicate the presence of particular fields in wideband-header field 412.

In some embodiments, frame format 400 may be viewed as a PLCP frame of long compatibility format, which may be used for transmission of frames of MAC type control signals such as RTS, CTS, ACK, as well as other control signals. For frames of format 400, the MPDU may reside in long-compatibility field 404, which may be a standard 802.11(a/g) data field.

Frames of format 400 may provide detection properties (e.g., maximum detection and PSDU decoding ranges) at least by narrower-band CUs. Frames of format 400 may also support NAV operation for narrower-band CUs and wider-band CUs (e.g., for all units in a given BSS). Frames of format 400 may also allow for the measurement of wideband-channel transfer functions using the wideband-training fields. Frames of format 400 may also allow for parallel measurement of the noise environment in a wideband channel at the receiver side during the transmission of short-compatibility field 402 and/or long-compatibility field 404. Frames of format 400 may also be used by a MAC layer of a CU to adapt dynamically to channel conditions by measuring the state of a channel and providing feedback on channel state. For example, an RTS/CTS exchange may be used with control frames in the wideband channel with channelization information. This may be done for almost any number of channels 302 (FIG. 3) in addition to compatibility channel 304 (FIG. 3).

Narrower-band CUs, such as CUs 110 (FIG. 1), may also use a conventional frame format, such as a standard 802.11 (a/g) PLCP frame format, for transmission of frames of MAC type management information (e.g., beacon frames and others). This conventional frame format may include a PLCP preamble field and a signal field, which may be followed by a data field. In the case of a standard 802.11(a/g) PLCP frame, the preamble field may comprise twelve OFDM symbols, the signal field may comprise one OFDM symbol, and the data field may comprise a variable number of OFDM symbols. In accordance with embodiments of the present invention, a data unit, such as a PPDU, in a conventional frame format may be transmitted over compatibility channel 304 (FIG. 3).

Figure 5:
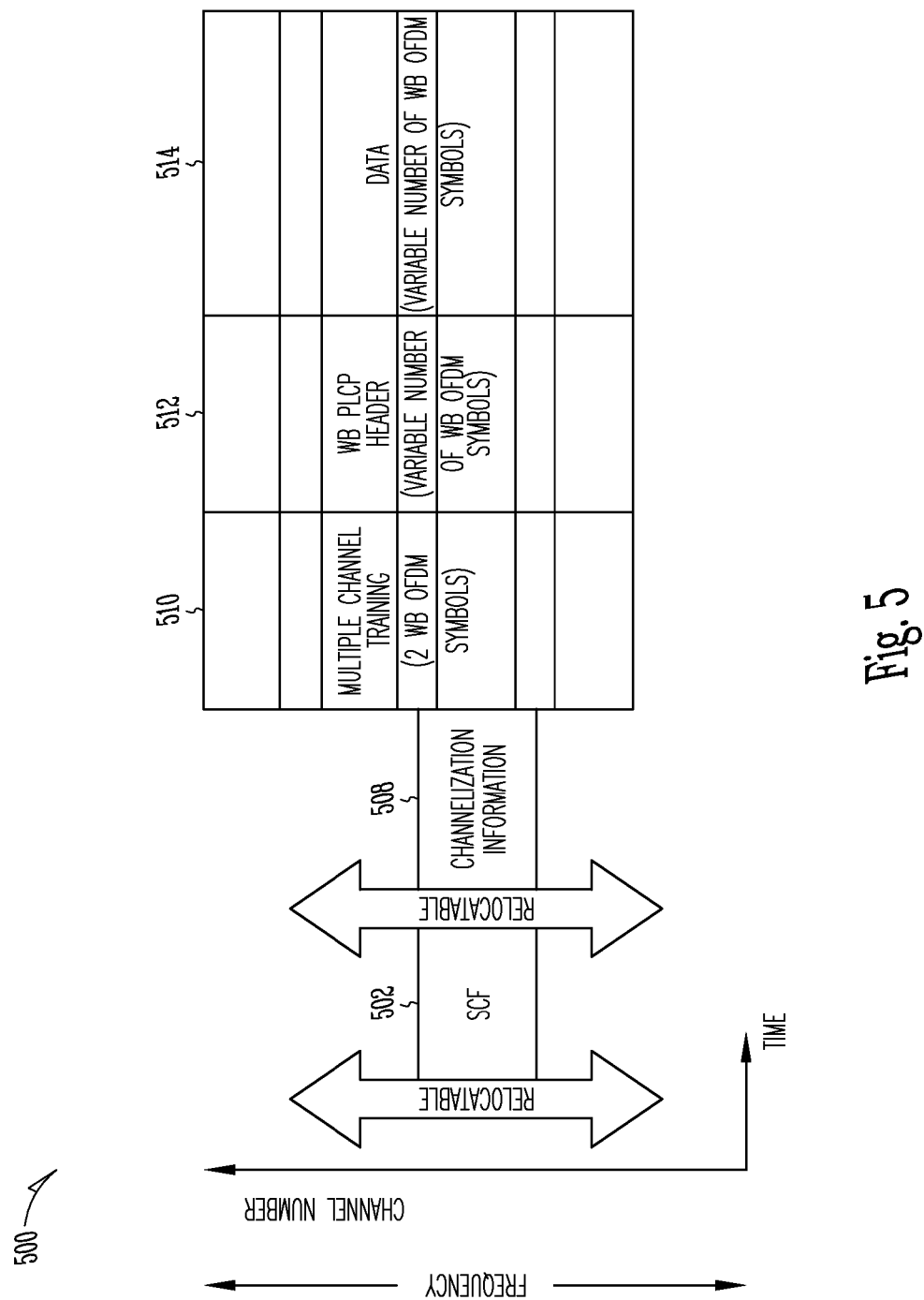
FIG. 5 illustrates a structure of a short-compatibility frame in accordance with some embodiments of the present invention.

FIG. 5 illustrates a structure of a short-compatibility frame in accordance with some embodiments of the present invention. Short-compatibility frame format 500 is an example of a HT OFDM frame and may be used for communications between wider-band CUs 108 (FIG. 1) and AP 104 (FIG. 1), although other frame formats may also be suitable. Frame format 500 may include short-compatibility field 502, channelization field 508, multiple-channel training field 510, wideband-header field 512 and wideband-data field 514. In some embodiments, short-compatibility field 502, and channelization field 508 may be sent on a compatibility channel, such as compatibility channel 304 (FIG. 3), which may be relocatable to any of the narrower-band channels. Multiple-channel training field 510, wideband-header field 512 and wideband-data field 514 may be sent on one or more channels, such as channels 306 (FIG. 3) including the compatibility channel.

In some embodiments, short-compatibility field 502 may correspond to short-compatibility field 402 (FIG. 4), channelization field 508 may correspond to channelization field 408 (FIG. 4), multiple-channel training field 510 may correspond to multiple-channel training field 410 (FIG. 4), and wideband-header field 512 may correspond to wideband-header field 412 (FIG. 4).

Wideband-data field 514 may be used to carry meaningful data, such as one or more physical service data unit (PSDUs). Format 500 may be viewed as a PPDU of short compatibility format in which an MPDU may reside in wideband-data field 514. Frames of format 500 may be used to transmit data-carrying MPDUs in an environment that includes narrower-band CUs and wider-band CUs. Frames of format 500 may allow high-speed data transmission for a dynamically changed channelization, which may be determined for a given moment from a prior training phase, such as an RTS/CTS signal exchange, which may be carried in frames of long-compatibility format 400 (FIG. 4). Frames of format 500 may also provide for the detection and standard signal field decoding range properties of frames by both narrower-band CUs and wider-band CUs. Frames of format 500 may also allow for ABPL functionality. The use of short-compatibility field 502 transmitted in compatibility channel 304 (FIG. 3) may help protect the frame from interferences from narrower-band CUs associated with a particular AP.

In some embodiments, a HT receiver may determine that the frame format comprises short-compatibility format 500 by using signaling within short-compatibility field 502. For example, a subfield with no meaning for narrower-band CUs may be used in short-compatibility field 502. Alternatively, a reserved value for a subfield used by narrower-band CUs may be used to indicate frame format 500.

Figure 6:
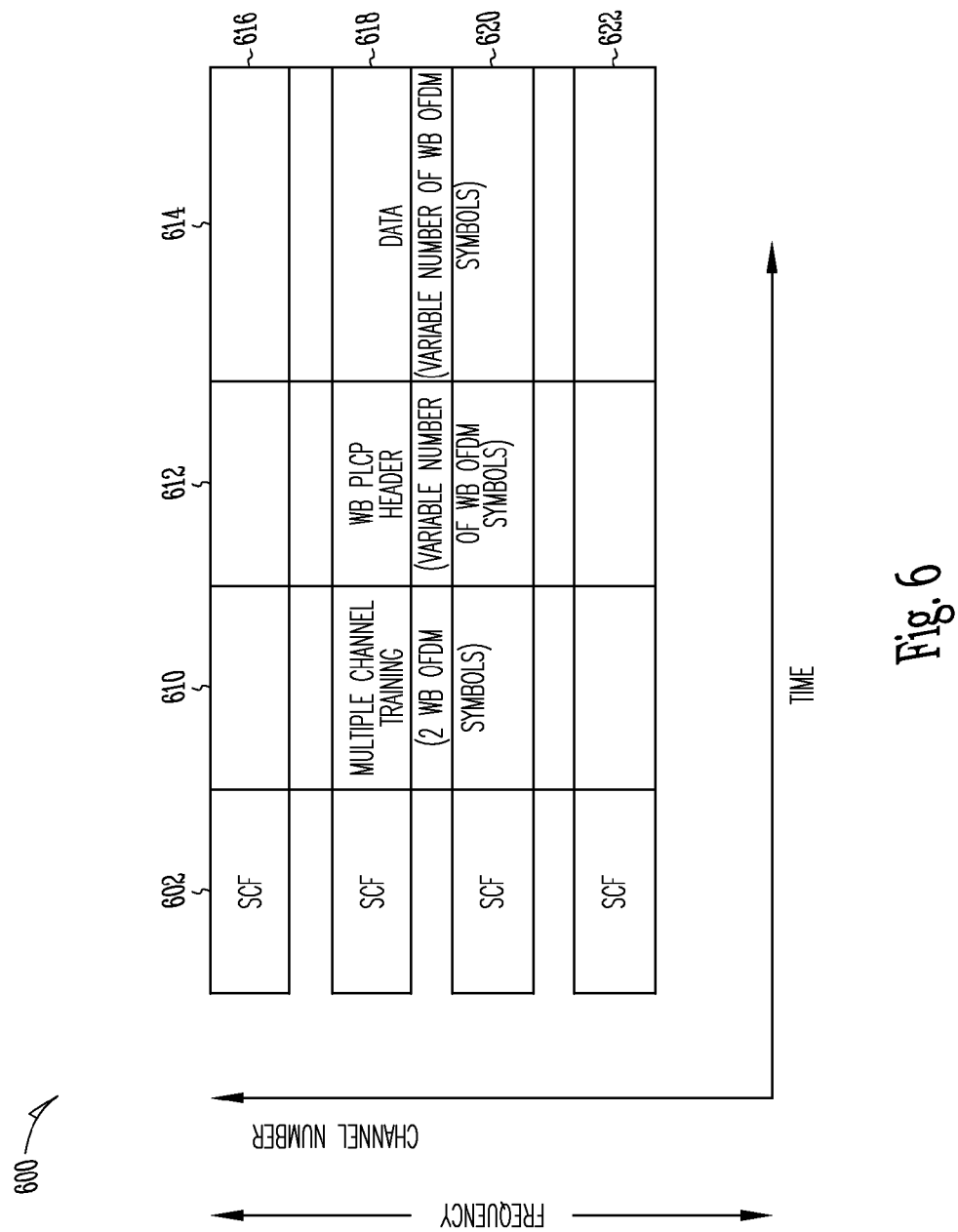
FIG. 6 illustrates a structure of a multiple-channel frame in accordance with some embodiments of the present invention.

FIG. 6 illustrates a structure of a multiple-channel frame in accordance with some embodiments of the present invention. Multiple-channel frame format 600 is an example of a HT OFDM frame and may be used for communications between wider-band CUs 108 (FIG. 1) and a HT AP such as AP 104 (FIG. 1), although other frame formats may also be suitable. Multiple-channel frame format 600 may include short-compatibility field 602, multiple-channel training field 610, wideband-header field 612 and wideband-data field 614. In some embodiments, short-compatibility field 602 may be multiplied in frequency and transmitted on one or more channels, such as channels 616, 618, 620 and 622. Multiple-channel training field 610, wideband-header field 612 and wideband-data field 614 may be different for the different channels, such as channels 616, 618, 620 and 622 for communicating with different wider-band CUs. In other words, wideband fields, such as wideband-header field 612 and wideband-data field 614, are spread across the used channels with different content on each channel. In some embodiments, a transmitting wider-band CU may use different channels depending on the receiving wider-band CU or the dynamics of the channel condition.

Frames of format 600 may be used in an environment that includes a combination of wider-band CUs and narrower-band CUs. Frames of format 600 may also be used when a HT AP overlaps (e.g., shares channels with) an AP that may communicate only with narrower-band CUs. Frames of format 600 allow narrower-band CUs, used in narrowband channels, to be provided with frame duration information at the physical layer through the signal field of short-compatibility field 602. Frames of format 600 may also reduce overhead due to the absence of a long-compatibility field and a channelization field, such as in the case of formats 400 and 500. Frames of format 600 may also provide an ability for CUs to distinguish frames of format 600 from conventional frames (e.g., standard 802.11(a/g) frames) at the very beginning of the frame during the energy detection phase. In embodiments, the receiver of an wider-band CU or HT AP may determine that the frame format comprises multiple-channel frame format 600 using a combination of energy detection in multiple narrow-band channels (e.g., individual channels 616, 618, 620 and 622) and signaling within short compatibility field 602. For example, a subfield within short compatibility field 602 may be used which may have no meaning for narrower-band CUs. Alternatively, a reserved value for a subfield used by narrower-band CUs may be used to indicate frame format 600.

FIG. 7 is a parameterization-mask table in accordance with some embodiments of the present invention. Parameterization-mask table 700 illustrates parameter mask 702 comprising bits with corresponding parameters in column 704. Parameter mask 702 is an example of a parameter mask that may be used in wideband-header field 412 (FIG. 4) and/or wideband-header field 512 (FIG. 5). The bits of parameter mask 702 may indicate the presence of particular fields in a wideband-header field and the presence of a wideband-data field, such as wideband-data field 514 (FIG. 5). Other ways of indicating the presence of particular information in a wideband-header field and the presence of a wideband-data field are within the scope of the present invention.

In accordance with some embodiments, a "1" in parameter mask 702 may indicate that a corresponding field is present in a wideband-header field. However, a one bit (e.g., bit #0) in field 706 may indicate the presence of a wideband-data field, such as wideband-data field 514 (FIG. 5), in the packet or PPDU. In alternative embodiments, "0s" may be used instead of "1s" provided that the CUs are aware of this. Furthermore, the precise values, order or size of the fields in parameter mask 702 is not critical.

In the case when there are no parameters to include into a wideband-header field, the wideband-header field may include a parameter mask field with all zero bits followed by a CRC field, tail bits and pad bits to occupy one wideband OFDM symbol. The parameter mask does not necessarily need to describe the presence of CRC field, tail bits and pad bits.

In accordance with some embodiments, a bit (e.g., bit #1) of parameter mask 702 may indicate the presence of field 708 which describes the bit loading per subcarrier. This parameter may describe the modulation type per subcarrier used to transmit the packet. The per-subcarrier modulations may be described for the narrowband channels as well as for the wideband channels.

In accordance with some embodiments, a bit (e.g., bit #2) may indicate the presence of field 710 which describes a power loading per subcarrier. This parameter may describe the power level per subcarrier applied during transmission of the packet through all the used channels.

In accordance with some embodiments, a bit (e.g., bit #3) may indicate the presence of field 712 which describes a coding rate. This parameter may indicate the coding rate(s) used in the packet.

In accordance with some embodiments, a bit (e.g., bit #4) may indicate the presence of field 714 which describes a length field which may indicate the number of octets in the PSDU that the MAC is currently requesting the physical layer to transmit.

In accordance with some embodiments, a bit (e.g., bit #5) may indicate the presence of field 716 which describes a transmit power level. The transmit power level parameter may indicate the power level at which the packet is transmitted.

In accordance with some embodiments, a bit (e.g., bit #6) may indicate the presence of field 718 which describes an available transmit power level. This parameter may indicate the maximum power level that the packet may be transmitted.

In accordance with some embodiments, a bit (e.g., bit #7) may indicate the presence of field 720 which indicates a channelization request. This parameter may contain a bit mask requesting narrowband channels to be used for transmission of a response packet. For example, each "1" in this mask may allow the corresponding channel to be used for response transmission.

In accordance with some embodiments, a bit (e.g., bit #8) may indicate the presence of field 722 which describes a bit-loading-per-subcarrier request. This parameter may request the modulation type per subcarrier to be applied during transmission of a response packet through the channels that are requested to be used by the channelization request parameter.

In accordance with some embodiments, a bit (e.g., bit #9) may indicate the presence of field 724 which describes a coding-rate request. This parameter may request coding rate(s) to be used in a response packet.

In accordance with some embodiments, a bit (e.g., bit #10) may indicate the presence of field 726 which describes a power-loading-per-subcarrier request. This parameter may request the modulation type per subcarrier to be applied during transmission of a response packet through the channels that are requested to be used by a channelization request parameter.

In accordance with some embodiments, a bit (e.g., bit #11) may indicate the presence of field 728 which describes a power request. This parameter may request an overall power level to be applied during a response transmission.

In accordance with some embodiments, a bit (e.g., bit #12) may indicate the presence of field 730 which requests a duration recommendation. This parameter may request the duration of the response packet. When granted, the fragmentation of the response packet should not exceed the value specified by this parameter.

In accordance with some embodiments, a bit (e.g., bit #13) may indicate the presence of field 732 which describes the presence of a service field which may be immediately before the PSDU payload. This field, for example, may be used to provide scrambler initialization. This field may be present when a self-synchronizing scrambler is used to reduce the impact of substantially non-white (i.e. many zeroes or ones) patterns in the PSDU data.

In accordance with some embodiments, a bit (e.g., bit #14) may indicate the presence of field 734 which describes channel reservation duration. The channel reservation duration parameter may have MAC layer NAV functionality by indicating the time which the channel is reserved for. The value of this field may be determined by the MAC layer based on frame type, channel quality and/or the amount of information to transmit.

In accordance with some embodiments, some bits of field 738 of parameter mask 702 (e.g., bits 15 through 17) may be reserved. In some embodiments, wideband-header field 412 (FIG. 4) and/or wideband-header field 512 (FIG. 5) may also include a cyclic-redundancy check (CRC) which may be calculated over the preceding fields starting at the parameter mask. Wideband-header fields 412 (FIG. 4) and 512 (FIG. 5) may also have a PLCP header tail, which may be needed to drive the encoder into a zero state for proper decoding. Wideband-header fields 412 (FIG. 4) and 512 (FIG. 5) may also have pad bits, which may be needed to fill the last OFDM symbol of the wideband-header field.

The frame formats of embodiments of the present invention may be suitable for WB OFDM data communication systems and may be implemented in IEEE 802.11 standards for HT communication units. The frame formats may be suitable for duplex time division multiplexing (TDM) communication between two communication units, when, for example, they are acting over non-stationary frequency-selective channel and use ABPL techniques. In some embodiments, the frame formats allow for channel state information (CSI) feedback from the receiver side to the transmitter side to allow for more optimal bit and power loading techniques previously discussed.

The frame formats of some embodiments of the present invention may also allow a WB OFDM system to share a geographic area and a frequency band with existing systems, such as 802.11(a/g) systems with narrower-band CUs. The frame formats of some embodiments may allow flexible physical-layer carrier-sense information for conventional 802.11(a/g) systems working in the same band. The frame formats of some embodiments of the present invention may also allow flexible MAC layer carrier sense information for these conventional systems. The frame formats of some embodiments of the present invention may also provide for multiple channel-width support for HT systems, while providing increased and reliability by applying adaptive modulation and coding techniques. The frame formats of some embodiments of the present invention may also allow estimating the channel variation and applying channel prediction techniques and adaptive fragmentation capability for WB OFDM systems. The frame formats of some embodiments of the present invention may also allow precision channel estimation for more effective performance of ABPL algorithms and better use of available channel capacity. The frame formats of some embodiments of the present invention may also allow for the detecting the frequency configuration of an incoming packet on the fly. The frame formats of some embodiments may also provide additional confidentiality for point-to-point data transmission.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

What is claimed is:

1. A high-throughput (HT) wideband communication unit comprising
a physical layer (PHY) and a media-access control (MAC) layer capable of sending a physical service data unit (PSDU) to the PHY for transmission by the PHY,
wherein the PHY is capable of transmitting a physical protocol data unit (PPDU) that includes the PSDU over up to four channels or more, wherein a channel of the up to four channels or more includes a primary channel and a secondary channel in non-contiguous portions of a spectrum and each channel is capable of transmitting orthogonal frequency division multiplexed (OFDM) symbols over a plurality of subcarriers of a wireless wideband communication, the PPDU having a frame structure including:
a field indicating a bit loading per subcarrier to transmit the PPDU;
a field indicating number of octets in the PSDU; and
a signal field including length and rate information.

2. The communication unit of claim 1, wherein the length and rate information determine a duration of the PPDU.

3. The communication unit of claim 1, wherein the frame structure further includes information regarding a frequency channelization structure of the PPDU.

4. The communication unit of claim 1, wherein a channel of the up to four channels or more includes a primary channel and a secondary channel in contiguous portions of a spectrum.

5. The communication unit of claim 1, wherein the frame structure further includes cyclic redundancy check information calculated over preceding fields.

6. The communication unit of claim 1, wherein the communication unit is a mobile unit and wherein the PPDU is configured and transmitted in accordance with an IEEE 802.11 communication standard.

7. The communication unit of claim 1, wherein the communication unit is an access point and wherein the PPDU is configured and transmitted in accordance with an IEEE 802.11 communication standard.

8. A method of high-throughput wideband communication in a wireless network, the method comprising:
transmitting orthogonal frequency division multiplexed (OFDM) symbols over a plurality of subcarriers on four or more channels of a wireless wideband communication medium, wherein at least one of the four or more channels includes a primary channel and a secondary channel in non-contiguous portions of a spectrum;
wherein the symbols are part of a physical protocol data unit (PPDU) including a physical service data unit (PSDU), the PPDU having a frame structure including:
a field indicating a bit loading per subcarrier to transmit the PPDU;

a field indicating number of octets in the PSDU;

a field indicating a bit-loading-per-subcarrier request for modulation type per subcarrier applied to transmission of a response packet in a group of narrowband channels;

a signal field including length and rate information.

9. The method of claim 8, wherein the length and rate information determine a duration of the PPDU.

10. The method of claim 8, wherein the frame structure further includes information regarding a frequency channelization structure of the PPDU.

11. The method of claim 8, wherein the frame structure further includes cyclic redundancy check information calculated over preceding fields.

12. A computer-readable non-transitory storage medium that contains instructions for high-throughput wideband communication, which when executed by one or more processors result in performing operations comprising:

transmitting orthogonal frequency division multiplexed (OFDM) symbols over a plurality of subcarriers on four or more channels of a wireless wideband communication medium, wherein at least one of the four or more channels includes a primary channel and a secondary channel in non-contiguous portions of a spectrum;

wherein the symbols are part of a physical protocol data unit (PPDU) including a physical service data unit (PSDU), the PPDU having a frame structure including:

a field indicating a bit loading per subcarrier to transmit the PPDU;

a field indicating number of octets in the PSDU;

a field indicating a bit-loading-per-subcarrier request for modulation type per subcarrier applied to transmission of a response packet in a group of narrowband channels;

a signal field including length and rate information.

13. The computer-readable medium of claim 12, wherein the length and rate information indicate a duration of the PPDU.

14. The computer readable medium of claim 12, wherein the frame structure further includes information regarding a frequency channelization structure of the PPDU.

15. The computer readable medium of claim 12, wherein the frame structure further includes cyclic redundancy check information calculated over preceding fields.

16. A high-throughput wideband communication unit including:

a protocol stack having an application layer, a network layer, a medium access control (MAC) layer and physical layer (PHY);

an antenna coupled with the PHY;

a controller to coordinate activities of the protocol stack;

wherein the MAC is capable of sending a physical-service data unit (PSDU) to the PHY for transmission by the PHY; and wherein the PHY is capable of transmitting a physical protocol data unit (PPDU) that includes the PSDU over more than four channels, wherein at least one channel of the more than four channels includes a primary channel and a secondary channel in non-contiguous portions of a spectrum, and each of the over more than four channels capable of transmitting orthogonal frequency division multiplexed (OFDM) symbols over a plurality of subcarriers of a wireless wideband communication, the PPDU having a frame structure including:

a field indicating a bit loading per subcarrier to transmit the PPDU;

a field indicating number of octets in the PSDU;

a field indicating a bit-loading-per-subcarrier request for modulation type per subcarrier applied to transmission of a response packet in a group of narrowband channels;

a signal field including coding rate information.

17. The communication unit of claim 16, wherein the length and rate information indicate a duration of the PPDU.

18. The communication unit of claim 16, wherein the frame structure further includes information regarding a frequency channelization structure of the PPDU.

19. The communication unit of claim 16, wherein at least one channel of the more than four channels includes a primary channel and a secondary channel in contiguous portions of a spectrum.

20. The communication unit of claim 16, wherein the frame structure further includes cyclic redundancy check information calculated over preceding fields.

21. The communication unit of claim 16, wherein the communication unit is a mobile unit and wherein the PPDU is configured and transmitted in accordance with an IEEE 802.11 communication standard.

22. The communication unit of claim 16, wherein the communication unit is an access point and wherein the PPDU is configured and transmitted in accordance with an IEEE 802.11 communication standard.

* * * * *